Patented Apr. 4, 1950

2,503,197

UNITED STATES PATENT OFFICE 2,503,197

DIBROMIDES OF 2-VINYLTHIOPHENES

William S. Emerson and Tracy M. Patrick, Jr., Dayton, Ohio, assignors to Monsanto Chemical Company, St. Louis, Mo., a corporation of Delaware No Drawing. Application May 1, 1947, Serial No. 745,252

5 Claims. (Cl. 260—329)

The present invention relates to dibromides of 2-vinylthiophenes.

Dibromides of vinyl substituted aromatic compounds are of value for the destruction of insect pests and similarly the dibromides of vinylthiophenes are toxic to certain pests.

The valuable new compounds of this invention possess the structure

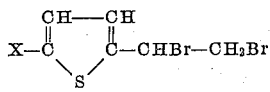

where X represents halogen or hydrogen. The compounds where X is halogen are more stable than the dibromide of vinylthiophene and therefore the compounds in which X is a chloro-, bromo-, iodo- or fluoro-radical are preferred.

The dibromides are conveniently prepared by treating a vinylthiophene with bromine. Vinylthiophenes may be prepared by reduction of 2-acetothienone and then dehydration of the resulting carbinol, Mowry, et al., J. Am. Chem. Soc., 68, 1105 (1946); Nazzaro, et al., J. Am. Chem. Soc., 68, 2121 (1946). They may also be prepared by dehydrochlorinating the 2-(alpha-chloroethyl)-thiophenes by treatment with suitable catalysts, as for example organic tertiary nitrogen bases or other strong organic base. 5-halo-2-vinylthiophenes and their preparation by dehydrochlorination of 2-(alpha-chloroethyl)thiophenes are disclosed and claimed in our co-pending application of even date.

The following examples are specific embodiments of the invention and are to be taken as illustrative, not limitative thereof.

EXAMPLE I

*Dibromide of 5-chloro-2-vinylthiophene*

Over a ninety-minute period a solution of 48 parts by weight of bromine in substantially 79 parts by weight of carbon tetrachloride was added to a solution of 40 parts by weight of 5-chloro-2-vinylthiophene in substantially 475 parts by weight of carbon tetrachloride. The temperature was kept at −5° to −1° C. during the addition. The solvent was removed by evaporation leaving a residue of 82.7 parts by weight of 5-chloro-2-vinylthiophene dibromide, M. P. 76° C. This and all other melting points are corrected. An analytical sample after two crystallizations from hexane showed the same melting point. Analysis gave 23.8% carbon and 1.92% hydrogen as compared to calculated values for $C_6H_5Br_2ClS$ of 23.7% carbon and 1.66% hydrogen.

EXAMPLE II

*Dibromide of 5-bromo-2-vinylthiophene*

A slight excess of bromine in carbon tetrachloride was added to a solution of 2.0 parts by weight of 5-bromo-2-vinylthiophene in carbon tetrachloride. Evaporation of the solution left a quantitative yield of 5-bromo-2-vinylthiophene dibromide, M. P. 80–82° C. An analytical sample melted at 82° C. after two crystallizations from hexane. Analysis gave 21.2% carbon and 2.05% hydrogen as compared to values calculated for $C_6H_5Br_3S$ of 20.7% carbon and 1.44% hydrogen.

EXAMPLE III

*Dibromide of 2-vinylthiophene*

The dibromide of 2-vinylthiophene was prepared in similar manner by treating 2-vinylthiophene with bromine. The product was a white solid which, however, was unstable and turned purple and decomposed on standing in air.

The present invention is limited solely by the claims attached hereto as part of the present specification.

What is claimed is:

1. A compound of the structure

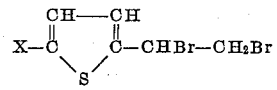

where X is a material of the group consisting of hydrogen and halogen.

2. A compound of the structure

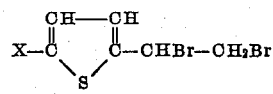

where X represents halogen.

3. A compound of the structure

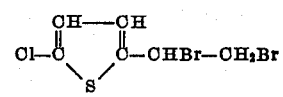

4. A compound of the structure

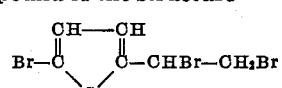

5. A compound of the structure

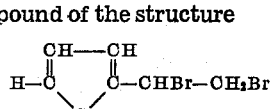

WILLIAM S. EMERSON.
TRACY M. PATRICK, JR.

REFERENCES CITED

The following references are of record in the file of this patent:

Gilman and Wright; J. Am. Chem. Soc., 52, 3350–1 (1930).

Moureu; Ann. Chem. (10), 7–8, 15, 16 (1927),